United States Patent
Michailiuk

[11] Patent Number: 5,966,870
[45] Date of Patent: Oct. 19, 1999

[54] FLEXIBLE MODULAR SOIL CONSERVING PLANTER

[76] Inventor: Rosa Michailiuk, 4621 Bougainvilla Dr., Lauderdale by the Sea, Fla. 33308

[21] Appl. No.: 08/901,856

[22] Filed: Jul. 29, 1997

Related U.S. Application Data

[63] Continuation-in-part of application No. 08/757,754, Nov. 16, 1996, abandoned.

[51] Int. Cl.⁶ ..................................................... A01G 9/02
[52] U.S. Cl. .................................... 47/73; 47/66.3; 47/85
[58] Field of Search .................................. 47/29, 73, 75, 47/27, 85, 66.3, 66.4, 66.5; 52/11

[56] References Cited

U.S. PATENT DOCUMENTS

| | | | |
|---|---|---|---|
| 3,670,505 | 6/1972 | Weaver | 52/11 X |
| 3,724,127 | 4/1973 | Rosenwach | 47/66.1 |
| 3,788,002 | 1/1974 | Suchka | 47/85 |
| 3,849,832 | 11/1974 | Adams | 47/73 |
| 3,987,585 | 10/1976 | Greenbaum | 47/85 |
| 4,341,040 | 7/1982 | Smith | 47/73 |
| 4,555,866 | 12/1985 | Stone | 47/23 |
| 5,417,015 | 5/1995 | Coyne | 52/11 |
| 5,544,446 | 8/1996 | Benson, Jr. | 47/45 |

*Primary Examiner*—Michael J. Carone
*Assistant Examiner*—Yvonne R. Abbott
*Attorney, Agent, or Firm*—M. K. Silverman

[57] ABSTRACT

A modular soil conserving planter is definable in terms of a longitudinal trough having open transverse end faces and longitudinal side walls which are axially compressible, laterally flexible integral accordion-like surface, the surface including elements for control of drainage from the trough and each end face of the trough further including snap-fittable selectable connections to open end faces of adjoining like planters. In the bottommost region of the planter are provided drainage openings which control the rate at which water can escape from the planter through the effect of gravity and of osmosis from the surrounding soil.

6 Claims, 6 Drawing Sheets

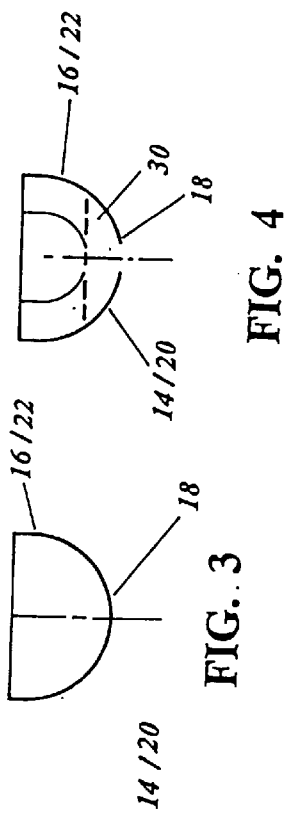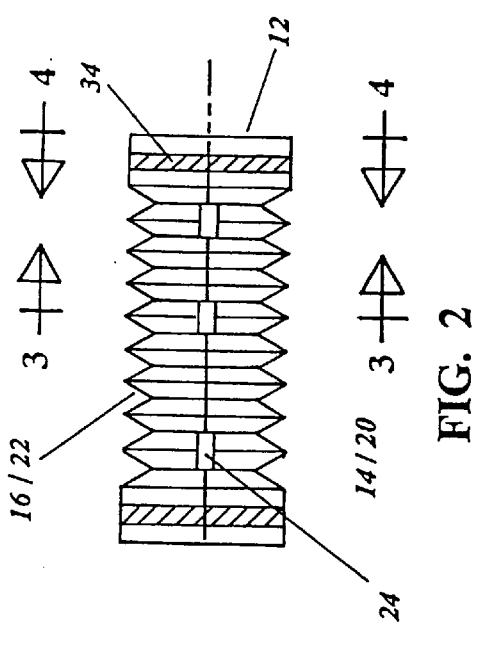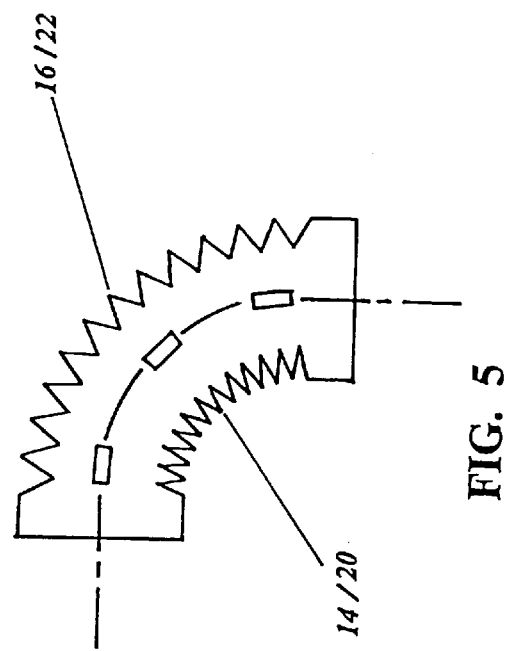
FIG. 2
FIG. 3
FIG. 4
FIG. 5

5,966,870

FLEXIBLE MODULAR SOIL CONSERVING PLANTER

REFERENCE TO RELATED APPLICATION

This case is a continuation-in-part of application Ser. No. 08/757,754, filed Nov. 16, 1996, now abandoned entitled Modular Soil Conserving Planter.

BACKGROUND OF THE INVENTION

The present invention relates to a modular soil planter having as its purpose the conservation of soil, nutrients, and moisture within a defined growing region. The invention more particularly relates to a means for the retention of top soil and its related plant nutrients against the effects of rain, wind and absorption by the ambient earth which, in the absence of such a planter, would occur. The present invention also addresses the needs of outside plants having large root systems.

The prior art in the instant area, as best known to the within inventor, is characterized by the use of a sheet of plastic to define growing regions for a plant and its root structure and to cover the surface area of soil surrounding the plant to minimize the effect of wind and erosion upon the soil and nutrient base of the plant.

While above ground planters, typically used in association with household plants, are well known in the art, inground planters for use in a yard or in general nursery applications are less common. Further, to the extent that such inground planters have existed in the art, they have suffered from a number of limitations which include lack of provision of adequate space or volume for the growth of roots, adequate drainage means or control of moisture within the planter, insufficient protection of soil in the planter from the effects of wind, lack of means to prevent absorption of nutrients by surrounding soil, and inability to construct larger planting systems from individual components of prior art planters.

Also, prior art planters, whether above or inground, have not been designed or used with a contemplation of re-usage of the soil thereof for the next growing season.

The instant invention may, accordingly, be viewed as a response to the above set forth long felt needs in the art in those areas set forth above.

SUMMARY OF THE INVENTION

The instant modular soil conserving planter comprises a longitudinal trough having open transverse end faces and longitudinal side walls defining an axially compressible, laterally flexible integral accordion-like surface, said surface including means for control of drainage from said trough and each end face of said trough further including means for selectable connection to open end faces of adjoining like planters. In the bottommost region of the planter are provided with a plurality of drainage opening which comprise means for selectably controlling the rate at which water can escape from the planter through the effect of gravity and of osmosis from the surrounding soil.

It is accordingly an object of the present invention to provide a modular soil conserving planter to protect nutrients and moisture-containing top soil from the effects of rain, wind and absorption by the surrounding unenriched soil and to facilitate botanical enrichment of the environment in nutrient-poor soil regions such as the desert.

It is another object to provide a planter which may be linked to a plurality of like or similar planters to form a planting system having any geometry, as may be desired for landscaping, soil control, or other purposes.

It is a further object of the invention to provide a soil conserving planter particularly adapted for external inground usage with plants having large root systems.

It is a yet further object to provide a planter of the above type which include means for control of the rate of drainage of water and moisture therefrom.

It is a still further object to provide a modular soil conserving planter of the above type which will permit the re-usage of nutrient enriched soil for successive growing seasons.

It is a still further object to provide a soil conserving planter of the above type which is particularly useful with plants having large or expanding root systems.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 2 is a top plan view thereof.

FIG. 3 is a radial cross-sectional view taken along Line 3—3 of FIG. 2.

FIG. 4 is an end view taken along Line 4—4 of FIG. 2.

FIG. 5 is a top plan view showing the flexible nature of the instant device.

DETAILED DESCRIPTION OF THE INVENTION

Figure 1:
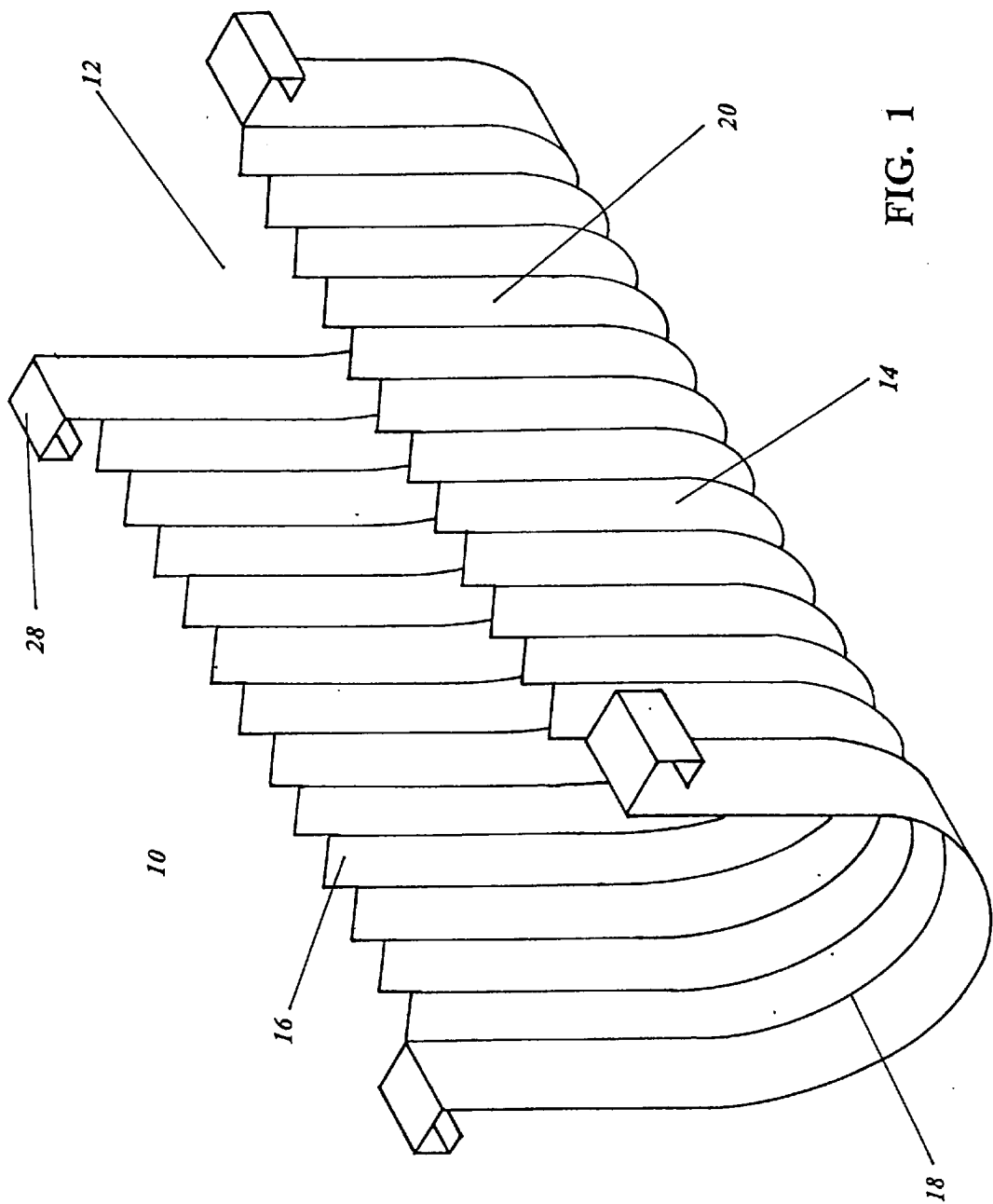
FIG. 1 is a perspective view of the instant modular soil conserving planter.
Figure 6:
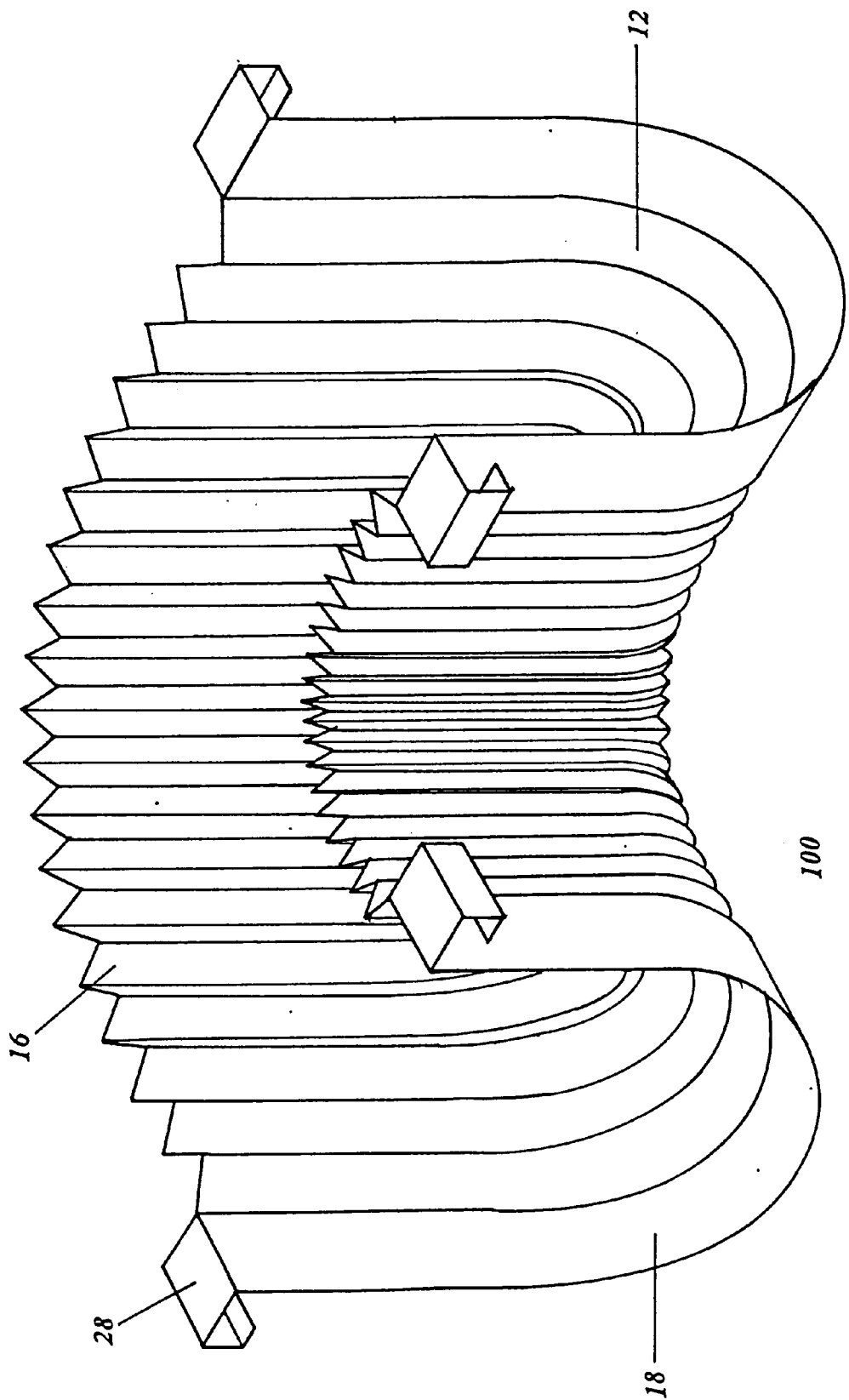
FIG. 6 is a perspective view of the plantar of FIG. 5.

With reference to the perspective view of FIG. 1, the instant inventive modular soil conserving planter may be seen to include a longitudinal trough 10 having open transverse end faces 12. Trough 10 further includes longitudinal side walls 14 and 16 which integrally connect through a lower portion 18 thereof. Said walls 14 and 16 of lower portion 18 define an axially compressible laterally flexible accordion-like surface 20. This structure may be seen with reference to the top plan view of FIG. 2. Therein, the accordion-like surface 20 of wall 14 and surface 22 of wall 16 may be seen to comprise a repeating triangular pattern in the horizontal plane of the modular planter. It, accordingly, may be appreciated that compression of the accordion-like surfaces 20 may occur along a horizontal longitudinal axis of the structure and, as shown in FIGS. 5, and 6, as the planter 10 is bent, that is, laterally flexed, the accordion surface 20 of wall 14 will become compressed while the accordion surface 22 of wall 16 will expand, thereby enabling the axis of longitudinal trough 10 to be bent over range of angles which exceeds 90 degrees.

It is noted that lower region 18 of longitudinal trough includes a plurality of slits 24 which comprise means for the control of drainage from the trough 10. Further, each trough 10 includes, at longitudinal ends thereof, means 28 for the selectable connection to open end faces of adjoining like planters. Said means 28 may take the form of a snap-clip which is oriented substantially horizontally relative to the trough 10.

As may be noted in the end plan view of FIG. 4, the instant modular plantar may also include a drainage grate 30 which is situated between twenty and thirty five percent of the vertical height of the trough as measured from the bottom thereof.

Accordingly, the drainage grate 30, and above-described drainage slots 24, will operate in combination to assure that, above the drainage grate 30, nutrient enrich growing soil is provided with that degree of moisture which is appropriate for the particular plant to be housed within the planter. It is to be further appreciated that any one or more of the drainage slots 24, as well as of the grate 30, may be fully or partially blocked in accordance with the drainage characteristics which is most advantageous to the particular species of plant to be grown within the planter.

With reference to FIG. 2, it is to be further noted that the planter may be provided with one or more anti-spread members 34 which may be fixed to the trough through connection to the geometry of the means 28 for the selectable connection of the open end face 12 to end faces of adjoining like planters.

Figure 7:
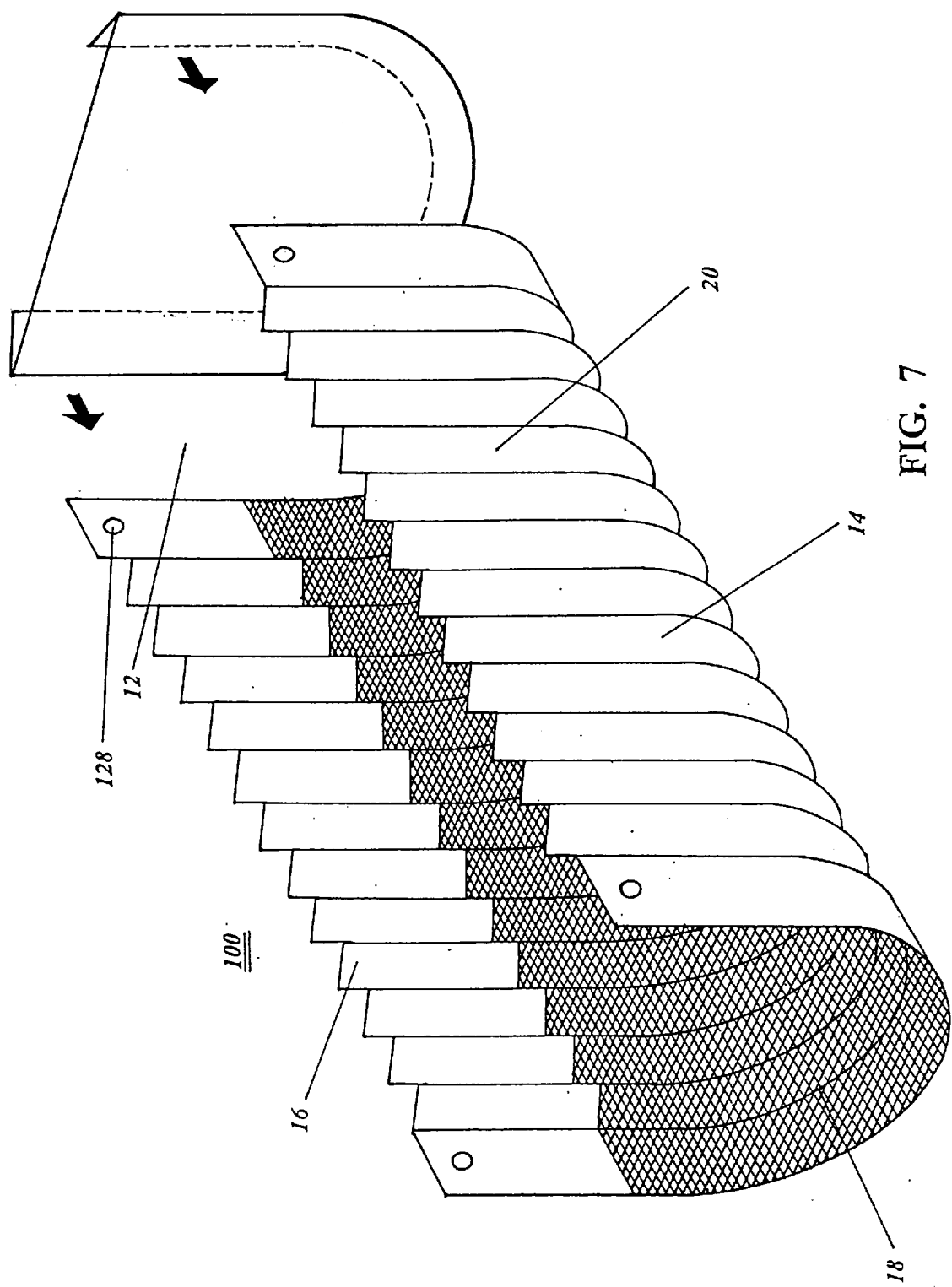
FIG. 7 is a perspective view of a second embodiment of the present invention.
Figure 8:
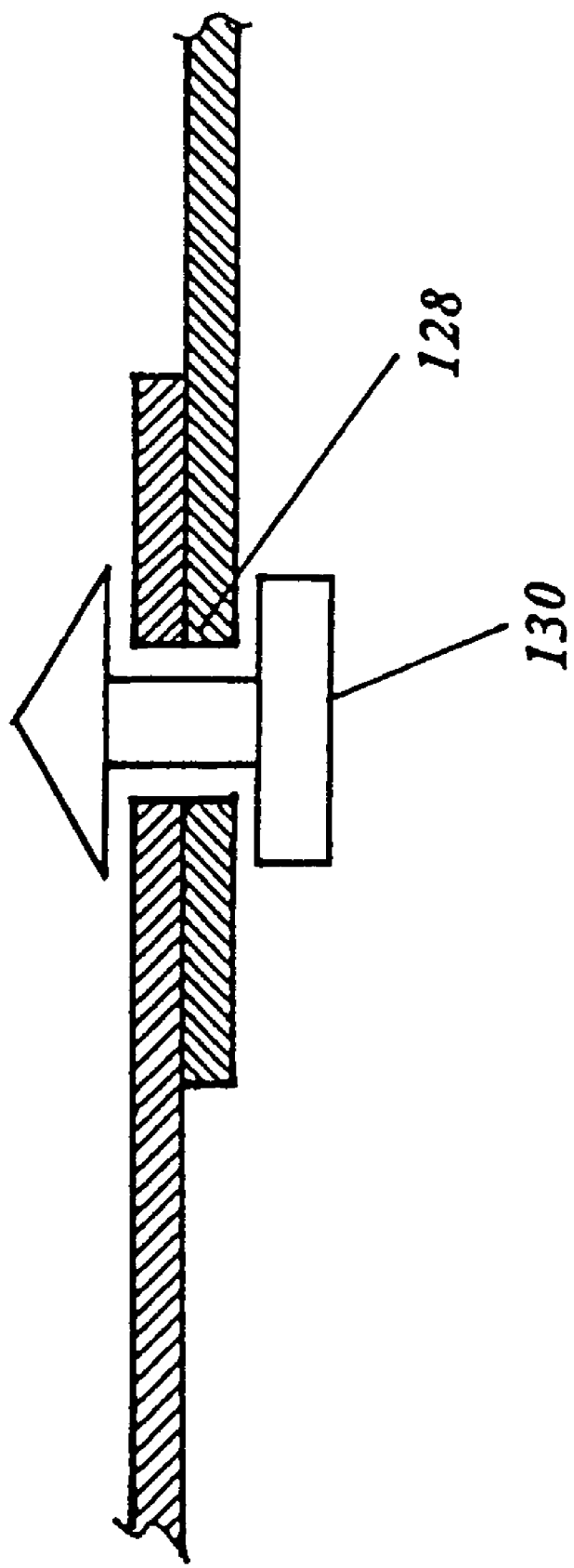
FIG. 8 is an enlarged view of a means for connecting adjoining planters to each other.
Figure 9:
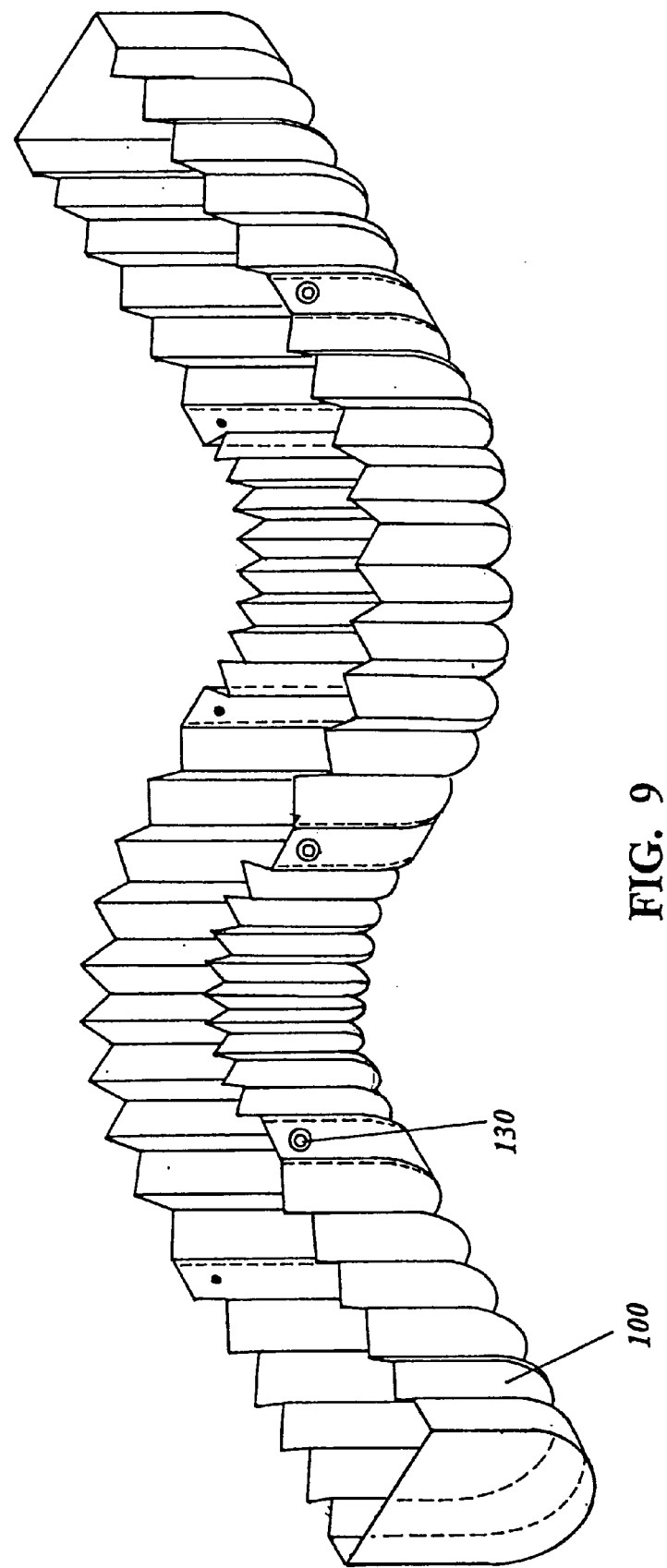
FIG. 9 is a perspective view of a group of the planters of the second embodiment connected to each other.

With reference to FIG. 7 is shown an alternate embodiment 100 of the invention in which the connection means 28 of the first embodiment is replaced by circular connection means 128. Said means 128, taken with connectors 130 (see FIG. 8) enable the planter 100 to be configured in any number of ways, including the pattern shown in FIG. 9.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention what I claim as new, useful and non-obvious and, accordingly, secure by Letters Patent of the United States is:

1. A modular soil conserving planter, comprising:

(a) a longitudinal trough having open transverse end faces and longitudinal sidewalls defining an axially compressible, laterally flexible integral accordion-like surface, said surface including means for control of drainage from said trough, each longitudinal end of said trough further including means for selectable connection to opposing longitudinal ends of adjoining like planters; and (b) a horizontal drainage grate, in which a vertical location of said horizontal grate within said trough is that of between twenty and thirty five percent of the vertical height of said trough measured from the bottom thereof.

2. The planter as recited in claim 1, in which said means for control of drainage comprise:

slots within a lower area of said trough surface.

3. The planter as recited in claim 2 in which said means for connection of open end faces of adjoining planters each comprise:

snap-clip securement means oriented substantially horizontally and proximal to ends of top edges of said trough.

4. The planter as recited in claim 2, in which said longitudinal trough is linear.

5. The planter as recited in claim 2, in which said longitudinal trough is curvilinear.

6. The planter as recited in claim 2, further comprising:

a plurality of anti-spread members disposed along an axis substantially transverse to a longitudinal axis defined by said longitudinal trough.

\* \* \* \* \*